March 28, 1961  H. C. HUEFFED ET AL  2,977,491

ELECTRICAL MACHINE STATOR STRUCTURE

Filed Oct. 31, 1957  3 Sheets-Sheet 1

INVENTORS
HOMER C. HUEFFED
ALBERT D. GILCHRIST
BY Hudson, Boughton,
Williams, David & Hoffmann
ATTORNEYS INVENTORS
HOMER C. HUEFFED
ALBERT D. GILCHRIST
BY Hudson, Boughton,
Williams, David & Hoffman
ATTORNEYS March 28, 1961 H. C. HUEFFED ET AL 2,977,491
ELECTRICAL MACHINE STATOR STRUCTURE
Filed Oct. 31, 1957 3 Sheets-Sheet 3

INVENTORS
HOMER C. HUEFFED
ALBERT D. GILCHRIST
BY
ATTORNEYS

United States Patent Office 2,977,491
Patented Mar. 28, 1961

2,977,491

ELECTRICAL MACHINE STATOR STRUCTURE

Homer C. Hueffed, Berea, and Albert D. Gilchrist, Rocky River, Ohio, assignors to The Leece-Neville Company, Cleveland, Ohio, a corporation of Ohio Filed Oct. 31, 1957, Ser. No. 693,684

4 Claims. (Cl. 310—259)

This invention relates to electric generating machines and provides novel core and stator constructions for machines of this kind.

An object of this invention is to provide a novel construction for an electrical machine of the kind having stator core means disposed between a pair of end members, and in which transversely flexible members mounted in the core means have projecting ends forming locating elements on the core means for mating engagement with locating elements on the end members.

Another object is to provide a novel construction for such an electrical machine in which the locating elements of the end members are recesses thereon and in which the locating elements of the core means comprise self-expanding end portions of the transversely flexible members and are engaged in such recesses.

Still another object is to provide such a novel electrical machine stator comprising a laminated core member and retaining members in the form of so-called "roll pins" extending through the core member and retaining the laminations thereof in a stacked relation, the locating elements on the ends of the core member being formed by the projecting ends of the roll pins.

This invention further provides an electric generator embodying novel stator construction of the kind above referred to and in which arm projections carried by the end members of the stator are positioned in a desired aligned relation by the mating cooperation of the locating elements of the end members and core means.

Additionally, this invention provides a novel construction for use in core members of electrical machines, comprising a transversely flexible hollow pin having a body portion mounted in the core member, preferably by a self-expanded engagement therein, and also having a projecting end portion, the pin being circumferentially slotted at the junction of the body and end portions thereof such that the end portion is self-expandable to a greater transverse dimension than that of the body portion.

Other objects and advantages of this invention will be apparent in the following detailed description and in the accompanying drawings forming a part of the present specification and in which, Fig. 1 is a longitudinal section taken through an electrical generator embodying the present invention;

Fig. 12 is a fragmentary view with portion in section, showing another form of roll pin on a larger scale and applied to a laminated core member;

Fig. 13 is a larger-scale fragmentary end view of the core assembly of Fig. 12;

Fig. 14 is a perspective view of the roll pin of Figs. 13 and 14 and showing the same in detached relation;

Fig. 15 is partial axial section showing still another generating machine embodying the present invention;

Fig. 16 is a side view showing the stator core of the machine of Fig. 15 in detached relation and in partial axial section as indicated by section line 16—16 of Fig. 15;

Fig. 17 is an end view of the stator core of Fig. 16;

Fig. 18 is a partial axial section corresponding with a portion of Fig. 15 but on a larger scale; and Fig. 19 is a fragmentary transverse section taken on section line 19—19 of Fig. 18.

Figure 1:
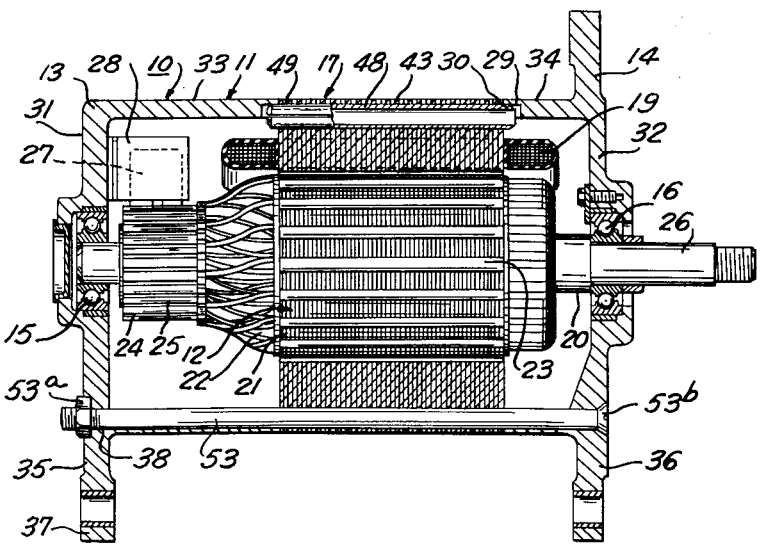
Figure 3:
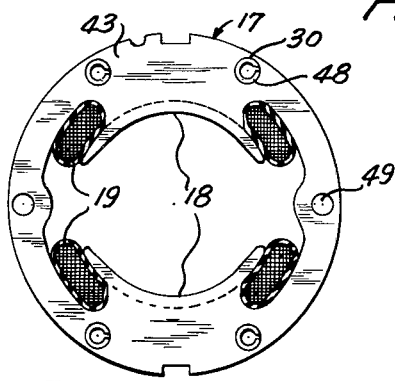
Fig. 3 is an end elevation of the stator core in detached relation and with the coils thereof shown in cross-section.
Figure 2:
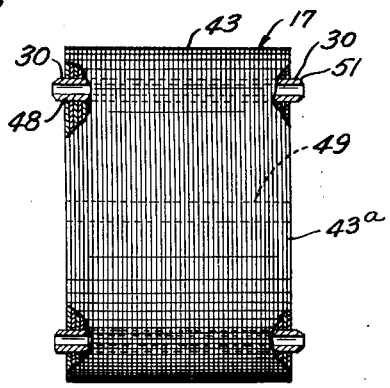
Fig. 2 is a side elevation of the stator core in detached relation and with portions thereof broken away.

As one of the preferred embodiments of the present invention, Fig. 1 shows an electrical machine 10 which, in this case, is a direct-current generator comprising cooperating stator and rotor members 11 and 12. The stator or field member 11 comprises a pair of cup-like hollow end members 13 and 14 having substantially aligned antifriction bearings 15 and 16 therein, and a laminated core 17 disposed between and clampingly engaged by the end members. The core 17 includes pole portions 18 having field or stator windings 19 thereon. The rotor or armature 12 comprises a shaft 20 supported in the bearings 15 and 16, and a laminated rotor core 21 mounted on the shaft and carrying rotor or armature windings 22 located in slots 23. The rotor 12 also comprises a commutator 24 having its segments 25 connected with the rotor windings 22.

The shaft 20 has an end portion 26 projecting beyond the bearing 16 and the rotor 12 is adapted to be driven by torque suitably applied to this projecting shaft portion. Suitable brushes 27 are provided for cooperation with the commutator 24 and are located in brush holders 28 mounted in the end member 13.

The end members 13 and 14 and the stator core 17 are provided with locating elements 29 and 30 which have a mating cooperation for positioning the end members in a desired relation to each other and to the stator core. The form of these locating elements and the functioning thereof will presently be described in greater detail.

The end members 13 and 14 are frame or housing members having transverse disc-like end walls 31 and 32 in which the bearings 15 and 16 are centrally mounted, and also have substantially cylindrical housing portions 33 and 34 extending toward each other with their adjacent ends in clamping engagement with the ends of the core 17. The end members 13 and 14 are here shown as being also provided with arm projections or brackets 35 and 36 projecting substantially radially therefrom and lying approximately in the same transverse planes as the end walls 31 and 32.

The brackets 35 and 36 are here shown as having an outwardly converging shape and as being provided at the outer end or apex thereof with a pivot portion or eye 37. The brackets 35 and 36 provide a mounting means for the generator 10 by which it can be swingably mounted on a portion of a vehicle engine or other suitable support.

Figure 4:
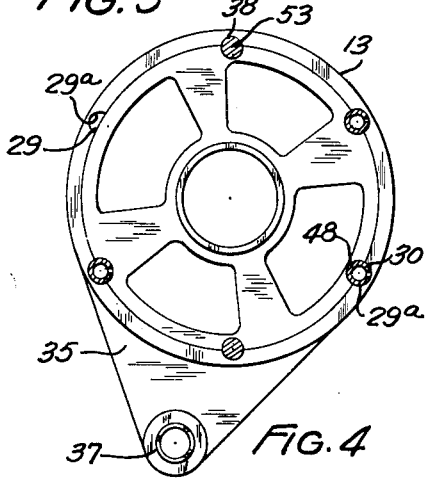
Fig. 4 is an end elevation of one of the end members of the stator and which also shows the cooperation of the locating elements of the core therewith.
Figure 6:
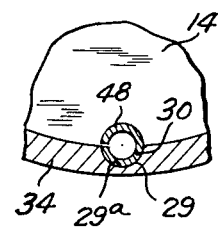
Fig. 6 is a fragmentary transverse sectional view taken on section line 6—6 of Fig. 5.

The above-mentioned locating elements 29 of the end members 13 and 14 are here shown as comprising recesses of a substantially half-circular shape formed in the adjacent ends of the housing portions 33 and 34 of these end members. As indicated in Figs. 4 and 6, the recesses 29 of each end member are in a circumferentially spaced relation in an annular series extending around the rotation axis of the shaft 20. The semicircular wall 29a of the recesses 29 forms a concave thrust surface facing radially inwardly toward the rotation axis. The end members 13 and 14 are also provided with bolt holes 38 located in the same annular series as the recesses 29 but preferably only at two diametrically opposed points as shown in Fig. 4.

The stator core 17 comprises a plurality of laminations 43 disposed in an axially extending stack and including end plates or laminations 43a. The core 17 also comprises retaining members 48 extending axially through the laminations 43 and retaining the latter in the stacked relation. The retaining members are disposed in an annular series extending around the rotation axis, in this instance, three such retaining members being shown. The core 17 is also provided with through passages 49 located in the same annular series as the retaining members 48 but in an alternating relation with the latter.

In accordance with the present invention, the retaining members 48 are transversely flexible resilient hollow pins which, in addition to holding the laminations 43 together in a tightly stacked relation, are of a length such that their ends project from the ends of the stack and form the locating elements or projections 30 of the core 17. The ends of the projections 30 preferably have an annular bevel or chamfer 51 thereon.

The retaining members 48 are here shown as made of sheet metal curved transversely into the form of hollow pins having a longitudinal slot or joint 52 in one side thereof. The pins 48 are suitably hardened and are preferably of the kind known as roll pins. The pins 48 are pushed through aligned openings of the laminations 43 and are self-expanding therein for retaining the pins in place in the stack in a connecting relation to the laminations and with their ends projecting from the core to form the locating elements 30 on the ends of the latter.

Figure 5:
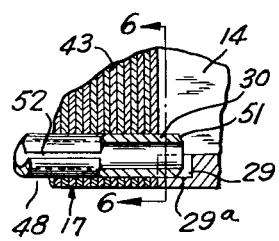
Fig. 5 is a fragmentary axial sectional view corresponding with a portion of Fig. 1 and illustrating the cooperation between the locating elements of the end members and stator core on a larger scale.

When the end members 13 and 14 are applied to the stator core 17 during the assembling of the generator 10, the locating elements 30 thus provided on the ends of the core engage in the locating recesses 29 of the end members as a pilot means, such that the end members are rotatably positioned relative to each other and relative to the stator core, and are also positioned relative to each other such that the brackets 35 and 36 and the eye portions 37 of the latter will be in a substantially axially aligned relation. The positioning engagement of the locating projections 30 of the stator core 17 in a mating relation in the recesses 29 of the end members 13 and 14 is clearly shown in the drawings, particularly in Figs. 5 and 6 thereof.

In cases where the bracket arms 35 and 36 are omitted from the end members of the generator 10, the locating recesses and projections 29 and 30 still accomplish an important function in assuring a proper orientation and positioning of the end members 13 and 14, such as for locating the brush holders 26 in proper relation to the field poles 18 during the assembling of the components of the generator. The locating elements 29 and 30 also produce an accurate relative radial positioning between the stator core 17 and the rotor core 21 for maintaining a desired close air-gap clearance between these cores.

In completing the assembly of the generator 10, the end members 13 and 14 are connected by bolt-like rods 53 having nut and head elements 53a and 53b thereon. The rods 53 extend through the passages 49 of the stator core 17 and through the bolt holes 38 of the end members 13 and 14 and hold the latter in the above-mentioned clamping engagement with the core. The rods 53 also hold the locating recesses 29 of the end members in their cooperating relation with the locating projections 30 of the stator core 17.

Figs. 7 to 11 inclusive show this invention applied to another form of electric generating machine, namely an alternator 60 comprising a stator member 61 and a rotor member 62 operable therein.

The stator 61 comprises a pair of end members 63 and 64 and a laminated stator core 65 disposed between and clampingly engaged by the end members. The end members 63 and 64 have transverse end walls 67 and 68 provided with centrally located anti-friction bearings 69 and 70 in which the shaft 71 of the rotor 62 is mounted. The stator core 65 has slots 65a therein and is provided with inductor windings 66 located in such slots.

The rotor 62 comprises a laminated rotor core 73 mounted on the shaft 71 and carrying a rotor winding 75 which, in this case, is a field winding. The rotor 62 also comprises a pair of slip rings 76 and 77 connected with the rotor winding 75 and engaged by suitably mounted brushes 78 and 79. The rotor 62 is driven by torque applied thereto through a pulley 80 mounted on the projecting end portion 81 of the shaft 71. A cooling fan 82 is also provided and can be rotatably connected with the shaft by means of screws 83 engaging in the collar 84 of the pulley 80.

The end members 63 and 64 are provided with the same semicircular locating recesses 29 as the end members of the above-described generator 10 and which are located in a circumferentially spaced relation in an annular series with the concave thrust wall 29a thereof facing toward the rotation axis of the shaft 71. Likewise, the end members 63 and 64 are provided with arm projections or brackets 35 and 36 corresponding with the bracket projections of the generator 10 and which have the same location and serve a similar purpose for swingably mounting the alternator 60 on a suitable support.

The stator core 65 comprises and axially extending stack of laminations 86, including end plates or laminations 86a and retaining members 48 extending through the laminations and having the same purpose as the retaining members of the stator core of the generator 10. That is to say, the retaining members 48 hold the laminations in the stacked relation and are transversely flexible hollow members of the tubular roll pin form described above and whose ends project from the core and form locating elements 30 thereon.

When the end members 63 and 64 are applied to the stator core 65 during the assembling of the alternator 60, the locating elements 30 on the ends of the core 65 engage in the locating recesses 29 of the end members and position the latter in the desired relation, as already explained above with respect to the end members 13 and 14 of the generator 10. The end members 63 and 64 are clampingly connected with the stator core 65 by bolt-like rods 88 extending through passages 87 of this core and having nut and head elements 88a and 88b thereon. The end members 63 and 64 are provided with bolt holes 90 to accommodate the rods 88.

Figs. 12, 13 and 14 of the drawings show a retaining member or roll pin 95 which is of a somewhat different form than the roll pin 48 described above and which has additional functions and advantages. The modified roll pin 95 is a transversely flexible, formed hollow sheet metal pin of a hardened character, similar to the above-described roll pin 48 but which is slotted circumferentially adjacent one or both ends thereof, such that the end portion 96 lying outwardly of the circumferential slot 97 is expandable to a greater transverse dimension than the body portion 98 of the pin. The roll pin 95 is split longitudinally along one side thereof by being provided with the longitudinal slot or joint 99 which extends for the full length of the body portion 98 of the pin and also across the end portions 96.

Figs. 12 and 13 show the modified roll pin 95 applied to a laminated core member 100 as a retaining member for the laminations 101 and end plates 102 of the stack comprising such core member. The pin 95 is of a length in relation to the thickness of the core member 100 such that the end portions 96 project beyond the end plates 102 and form locating projections or pilot elements on the core member similar to the above-described locating elements 30.

The core member 100 has a through opening 104 therein in which the body portion 98 of the pin 95 is mounted by a self-expanding engagement of such body portion therein. Since the end portions 96 project beyond the end plates 102, they are self-expandable to a greater transverse dimension than the body portion 98 (which is confined in the opening 104) and will cooperate with or lie against the outer surfaces of the end plates for maintaining the laminations in a stacked and clamped relation. Fig. 13 shows this self-expanded condition of greater transverse dimension of one of the end portions 96.

Figure 7:
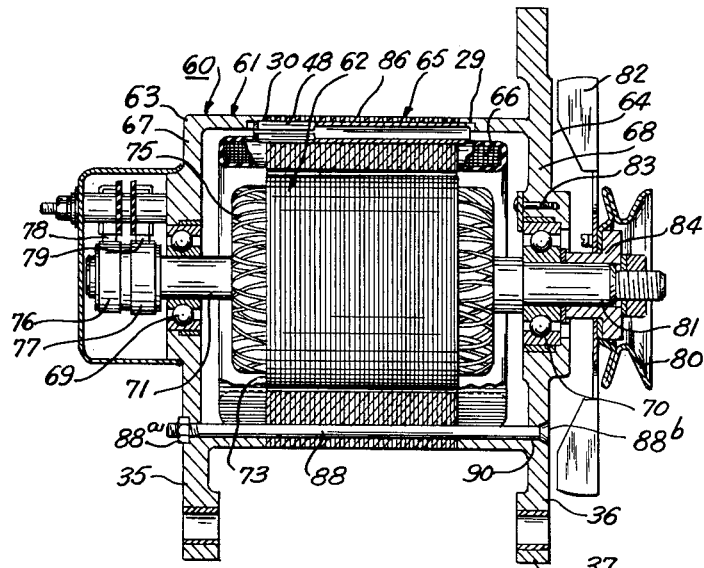
Fig. 7 is a longitudinal section taken through another electrical generator embodying the present invention.
Figure 9:
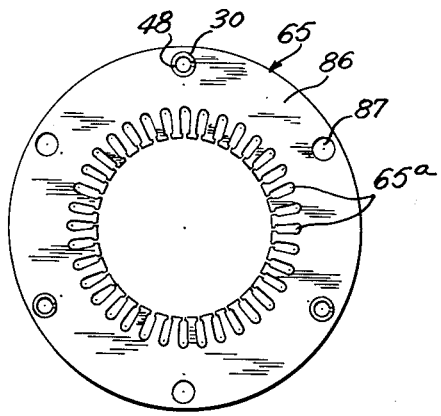
Fig. 9 is an end elevation of the stator core and showing the same with the coils omitted therefrom.
Figure 8:
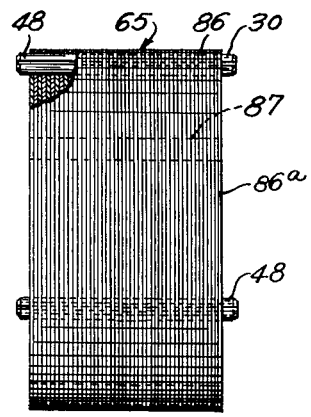
Fig. 8 is a side elevation of the stator core thereof in detached relation.

In addition to their function of serving as retaining portions or heads, the end portions 96 of the roll pin 95 form locating projections or pilot elements on the ends of the core member 100 for positioning cooperation with recesses or holes provided in associated members between which the core member 100 is to be assembled, such as the end members 13, 14 and 63, 64 of the generating machines 10 and 60 shown in Figs. 1 and 7 of the drawings. To facilitate the insertion of the end portions 96 into such cooperating recesses or holes of the associated parts, the end portions are preferably provided with chamfers 105. When the end portions 96 are thus inserted as locating projections or pilot elements into the recesses or holes of such associated assembly parts, they are partially contracted during such insertion and the self-expanding tendency thereof causes them to take up any existing play or looseness and an accurate locating cooperation will thus be obtainable for the achievement of the advantages already explained above.

Figs. 15 to 19 inclusive of the drawings show the use of roll pins 107, of a form similar to the above-described roll pin 95, in an electrical machine 108 which is here shown as being a direct current generator of a form generally similar to the generator 10 shown in Fig. 1. The components of the generator 108 which are of substantially the same form and correspond with components of the generator 10 have been designated by the same reference characters.

The generator 108 differs from the generator 10 in that the stator core 17 comprises an outer support ring 109 of a solid construction, and laminated pole shoes 110 located within the support ring and mounted on the latter as by means of screws 111. The generator 108 also differs from the generator 10 in that the roll pins 107 are mounted in the support ring 109 at opposite ends thereof rather than in a laminated portion of the core.

To accommodate the roll pins 107, the mounting ring 109 is provided with a group of axial openings 112 which extend thereinto from opposite ends thereof but which preferably do not extend for the full axial length of the ring. The pins 107 are similar to the above-described roll pins 95 but are relatively shorter and have only one projecting end portion 113 projecting from the supporting ring 109. The inner end or body portion 107a of each of the roll pins 107 is mounted in one of the openings 112 by the self-expanding engagement of such body portion therein. The roll pins 107 are longitudinally split on one side thereof as indicated at 114, and are slotted circumferentially thereof by the provision of a slot 115 extending part-way around the pin and located at a point thereon such that the end portion 113 projects outwardly from, and lies beyond, the end of the support ring 109 and is self-expandable to a greater transverse dimension than the confined body portion 107a of the pin.

The projecting end portions 113 of the roll pins 107 form locating projections or pilot elements on the ends of the stator core 17 and have mating cooperation with locating elements 116 provided on the end members 33 and 34. The locating elements 116 are here shown as being holes of full circumference extending axially into the end members 33 and 34 such that when the locating projections 113 are engaged therein, the end members 33 and 34 will be positioned relative to the stator core 17 and relative to each other for proper and accurate alignment of the assembled components of the generator and with an accurately maintained close air-gap relation between the rotor core 21 and the pole shoes 110. The locating projections 113 preferably have a chamfer 117 thereon to facilitate their insertion into the holes 116 and the self-expanding action of the projections in the holes causes all looseness and play to be taken up for a more accurate positioning of the assembled components.

Figure 10:
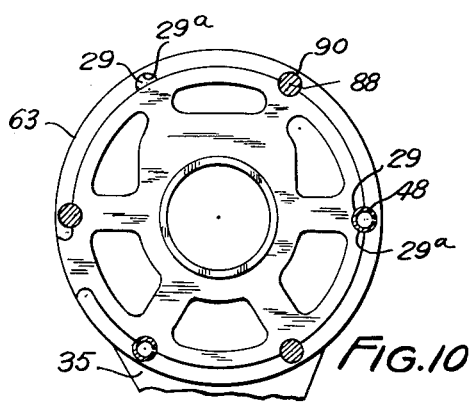
Fig. 10 is a partial end elevation of one of the end members of the stator and which also shows the cooperation of the locating elements of the core therewith.
Figure 11:
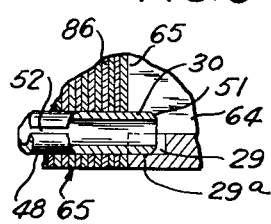
Fig. 11 is a fragmentary axial sectional view corresponding with a portion of Fig. 7 and illustrating the cooperation between the locating elements of the end members and stator core on a larger scale.

With respect to the above-described roll pin 95 of Figs. 12, 13 and 14, it should be understood that this form of roll pin can be used in the electrical machines 10 and 60 of Figs. 1 and 7 respectively in place of the roll pins 48, and that when the modified roll pin 95 is used in those machines, the end members thereof can be provided with either the half-circumference locating recesses 29 of Figs. 6 and 10 or the full-circumference locating holes 116 of Figs. 18 and 19.

From the accompanying drawings and the foregoing detailed description it will now be readily understood that this invention provides a novel electrical machine construction in which the end members and core means of the stator of a generator or alternator have locating elements thereon whose mating cooperation positions the end members in a desired relation with respect to each other and with respect to the core means during the assembling of the components of the machine, and in which the locating elements of the core means are formed by end projections of transversely flexible members or pins mounted in such core means. It will now also be understood that this invention provides a novel core and stator construction for electrical machines, in which the end projections of the transversely flexible members are self-expanding to a greater transverse dimension than the body portion of those members for more effective locating cooperation with the recesses or holes of the associated end members and, in the case of a laminated core, for retaining cooperation with the end plates or laminations of the stack. Additionally, it will now be understood that the roll pins of this invention can be readily mounted in the core means by the self-expanding engagement of the pins therein.

Although the novel electrical machines and the novel core and stator constructions of the present invention have been illustrated and described herein to a somewhat detailed extent, it will be understood, of course, that the invention is not to be regarded as being limited correspondingly in scope but includes all changes and modifications coming within the terms of the claims hereof.

Having thus described our invention, we claim:

1. In an electric generator; a stator comprising a pair of end members and a stator core comprising a stack of lamination plates disposed therebetween; bearings on said end members; a rotor comprising a shaft rotatably supported by said bearings, and a rotor core on said shaft and rotatable in said stator core; windings on said stator core and rotor core; said end members having locating recesses thereon; transversely flexible self-expanding pins having end portions and body portions; said body portions being mounted in said stator core; said end portions projecting from said stator core and forming locating projections on the ends of the latter; said pins being of longitudinal split, resilient-wall, tubular form; said pins having circumferential slots separating said end portions from said body portions; said locating projections formed by said end portions being self-expanding independently of said body portions; said locating projections being expanded with respect to said body portions and in clamping relation to the outer surfaces of the end lamination plates of said stack; and connecting members holding said end members in clamped engagement with said stator core; said locating projections being engaged in said locating recesses for relatively positioning said end members with respect to said stator core.

2. An electric generator as defined in claim 1 in which said end members have bracket arms thereon; and in which the relative positioning of said end members by the engagement of said locating projections in said locating recesses positions said bracket arms in an axially aligned relation.

3. A stator for an electrical machine comprising, a pair of end members having locating holes therein, core means comprising a stack of laminated plates disposed between and clampingly engaged by said end members, and hollow pins having body portions mounted in said core means and projecting end portions forming locating projections on the ends of said core means and engaged in said holes, said end portions being separated from said body portions by circumferential slots rendering said end portions transversely flexible and self-expanding independently of said body portions for acting in clamping relation on said stack of laminated plates and in locating cooperation with portions of said end members surrounding said holes.

4. A generator frame structure comprising, a pair of annular end members in a spaced-apart relation on a common axis and having locating recesses thereon, said recesses being on axially adjacent end portions of said end members and spaced circumferentially around said common axis, an annular laminated core disposed between and clampingly engaged by said end members, tubular members having body portions thereof mounted in said core and independently self-expanding end portions projecting from the core, said end portions being self-expanding in axial clamping engagement with the outer surfaces of the end laminations of said core and forming pilot elements on the ends of the latter, said pilot elements being engaged in a self-expanding manner in said recesses, and clamping rods connecting said end members and holding the same against said core.

References Cited in the file of this patent

UNITED STATES PATENTS

| | | |
|---|---|---|
| 917,188 | Tirrill | Apr. 6, 1909 |
| 931,620 | Kelley | Aug. 17, 1909 |
| 2,460,063 | Cole | Jan. 25, 1949 |

FOREIGN PATENTS

| | | |
|---|---|---|
| 739,992 | Great Britain | Nov. 2, 1955 |